(12) United States Patent
Ito

(10) Patent No.: US 11,462,968 B2
(45) Date of Patent: Oct. 4, 2022

(54) ELECTROMAGNETIC BRAKE FOR ELECTRIC MOTORS

(71) Applicant: FANUC CORPORATION, Yamanashi (JP)

(72) Inventor: Takashi Ito, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 17/080,547

(22) Filed: Oct. 26, 2020

(65) Prior Publication Data

US 2021/0126507 A1 Apr. 29, 2021

(30) Foreign Application Priority Data

Oct. 29, 2019 (JP) .............................. JP2019-195739

(51) Int. Cl.

| | |
|---|---|
| H01F 3/00 | (2006.01) |
| H02K 7/102 | (2006.01) |
| H01R 4/28 | (2006.01) |
| H01F 7/08 | (2006.01) |
| H01F 7/16 | (2006.01) |
| H01F 27/28 | (2006.01) |
| H01F 27/24 | (2006.01) |

(52) U.S. Cl.
CPC ........... *H02K 7/1023* (2013.01); *H01F 7/081* (2013.01); *H01F 7/16* (2013.01); *H01R 4/28* (2013.01); *H01F 27/24* (2013.01); *H01F 27/28* (2013.01); *H01R 2201/22* (2013.01)

(58) Field of Classification Search
CPC .... H02K 7/1023; H02K 5/225; H02K 7/1025; H01F 7/081; H01F 7/16; H01F 27/24; H01F 27/28; H01F 2007/062; H01F 5/04; H01F 7/1638; H01F 5/02; H01R 4/28; H01R 2201/02
USPC ......................................................... 335/297
See application file for complete search history.

(56) References Cited

U.S. PATENT DOCUMENTS

| | | | |
|---|---|---|---|
| 2007/0012301 A1* | 1/2007 | Tauchi ................. | H01F 27/022 123/634 |
| 2021/0126507 A1* | 4/2021 | Ito ......................... | H02K 5/225 |

FOREIGN PATENT DOCUMENTS

| | | | | |
|---|---|---|---|---|
| JP | 20000035449 A | * | 12/2000 | ............. H02K 7/063 |
| JP | 2012036786 A | * | 2/2012 | |
| JP | 2012092723 A | * | 5/2012 | |
| JP | 2012094629 A | * | 5/2012 | |
| JP | 2012094636 A | * | 5/2012 | |
| JP | 2012094644 A | * | 5/2012 | |
| JP | 2016-196948 A | | 11/2016 | |

* cited by examiner

*Primary Examiner* — Shawki S Ismail
*Assistant Examiner* — Lisa N Homza
(74) *Attorney, Agent, or Firm* — Robert P. Michal, Esq.; Carter, DeLuca & Farrell LLP

(57) ABSTRACT

An electromagnetic brake for an electric motor includes a brake core having a coil bobbin holder in which a coil bobbin is housed and a connector insertion hole into which a connector is inserted. The coil bobbin includes plural terminal casings in each of which a terminal is set. The terminal has a first contact, which creates a connection with a winding engaged in catches of the terminal casing with the terminal inserted in the terminal casing, and a second contact which contacts an electrode of the connector inserted in the connector insertion hole with the terminal set in place in the terminal casing.

8 Claims, 20 Drawing Sheets

THE COIL NOT EXCIDED

THE COIL EXCITED

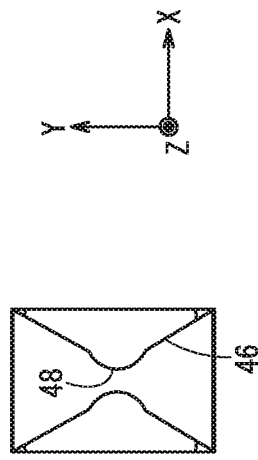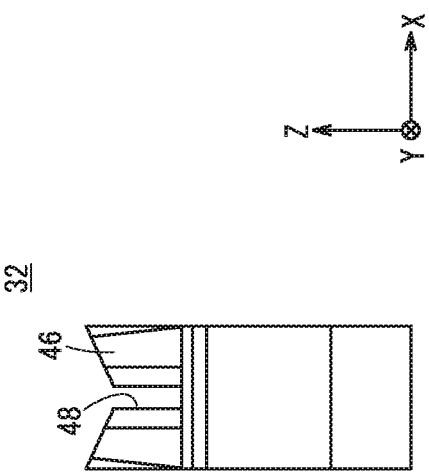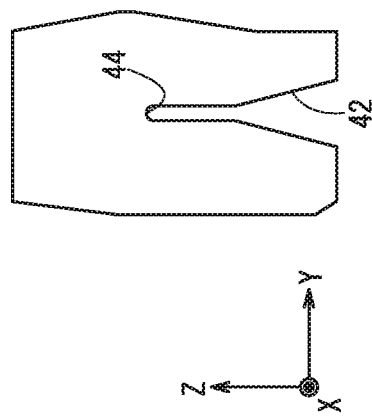

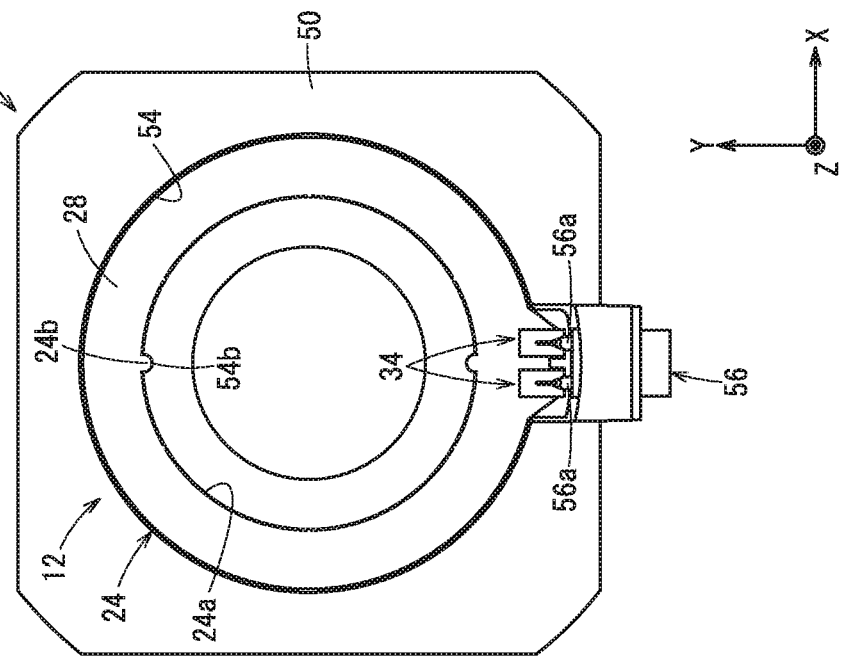
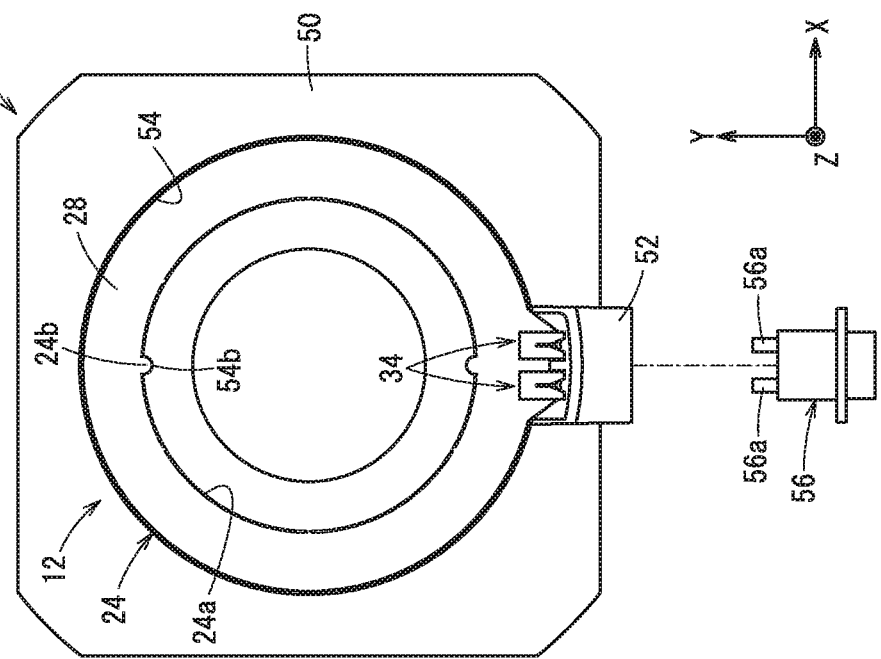

ELECTROMAGNETIC BRAKE FOR ELECTRIC MOTORS

CROSS-REFERENCE TO RELATED APPLICATION

This application is based upon and claims the benefit of priority from Japanese Patent Application No. 2019-195739 filed on Oct. 29, 2019, the contents of which are incorporated herein by reference.

BACKGROUND OF THE INVENTION

Field of the Invention

This invention relates to an electromagnetic brake for electric motors which is driven by an electromagnetic force generated when a coil is energized.

Description of the Related Art

Conventionally, there has been an electromagnetic brake for electric motors which is driven by an electromagnetic force generated when a coil is energized (e.g., Japanese Laid-Open Patent Publication No. 2016-196948).

SUMMARY OF THE INVENTION

In order to connect the electrodes of a connector to which power is supplied from an external power supply with the winding of a coil, the electrodes and the winding have to be joined by soldering or the like, so the fabrication of an electromagnetic brake has been troublesome.

The present invention has been devised to solve the above problem and it is therefore an object of the present invention to provide an electromagnetic brake for electric motors, which can be made easier to fabricate.

The aspect of the invention resides in an electromagnetic brake for an electric motor, including: a coil bobbin on which a winding is wound; a connector including a plurality of electrodes and configured to be externally inserted; and a brake core including a coil bobbin holder in which the coil bobbin is housed and a connector insertion hole into which the connector is inserted, wherein the coil bobbin includes a plurality of terminal casings in each of which a terminal is set, and catches formed on any of walls of each of the terminal casings so as to have the winding engaged therein, and wherein the terminal includes: a first contact configured to create a connection with the winding engaged in the catches, with the terminal inserted in the terminal casing; and a second contact configured to come into contact with the electrode of the connector inserted in the connector insertion hole, with the terminal set in place in the terminal casing.

According to the present invention, the fabrication of an electromagnetic brake for electric motors can be facilitated.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A is a view of the terminal from the positive side of the X-axis direction, FIG. 7B is a view of the terminal viewed from the positive side of the Z-axis direction, FIG. 7C is a view of the terminal viewed from the negative side of the Y-axis direction;

FIG. 20A is a diagram showing a state just before the connector is mounted in a brake core, FIG. 20B is a diagram showing a state in which the connector has been mounted in the brake core.

DESCRIPTION OF THE PREFERRED EMBODIMENTS

First Embodiment

Figure 1A:
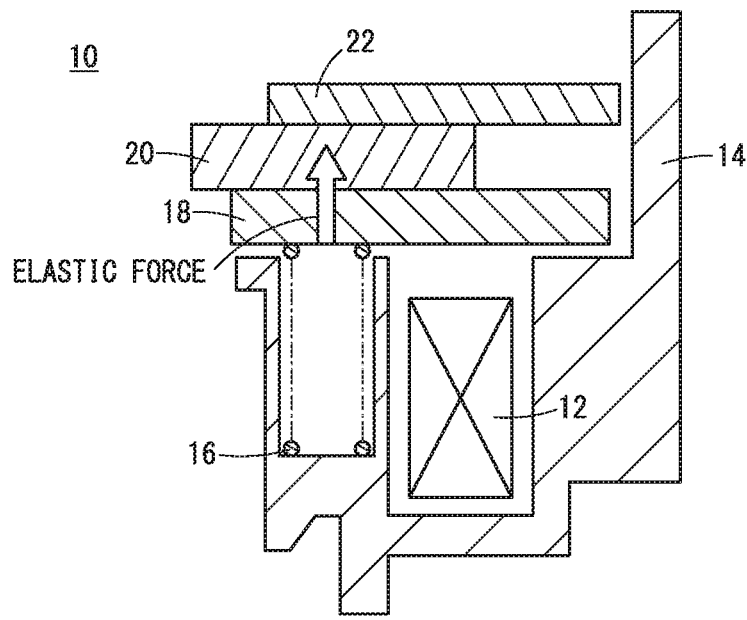
FIGS. 1A and 1B are schematic diagrams of an electromagnetic brake of an electric motor.
Figure 1B:
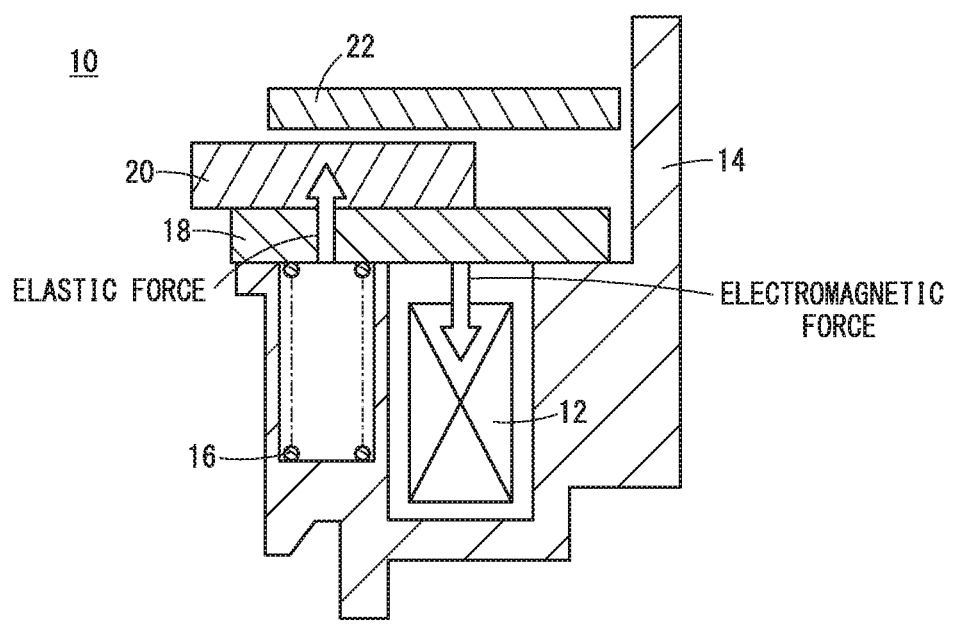

FIGS. 1A and 1B are schematic diagrams of an electromagnetic brake 10 of an electric motor. FIG. 1A shows a coil 12 not being excited, and FIG. 1B shows the coil 12 being excited. The electromagnetic brake 10 has the coil 12, a brake core 14, a spring 16, an armature 18, a friction plate 20 and an end plate 22.

When the coil 12 is not excited, the elastic force of the spring 16 pushes the armature 18 toward the friction plate 20 that rotates together with the rotor of the electric motor. The friction plate 20 is held between the armature 18 and the end plate 22 to generate a braking torque or holding torque in the electric motor.

When the coil 12 is excited, an electromagnetic force is generated by the coil 12 and the brake core 14 formed of a magnetic material, so that the armature 18 formed by a magnetic element is pulled toward the coil 12. As the armature 18 moves toward the coil 12 against the elastic force of the spring 16, the friction plate 20 moves away from the end plate 22 and the braking torque or holding torque of the electric motor is released.

Figure 2:
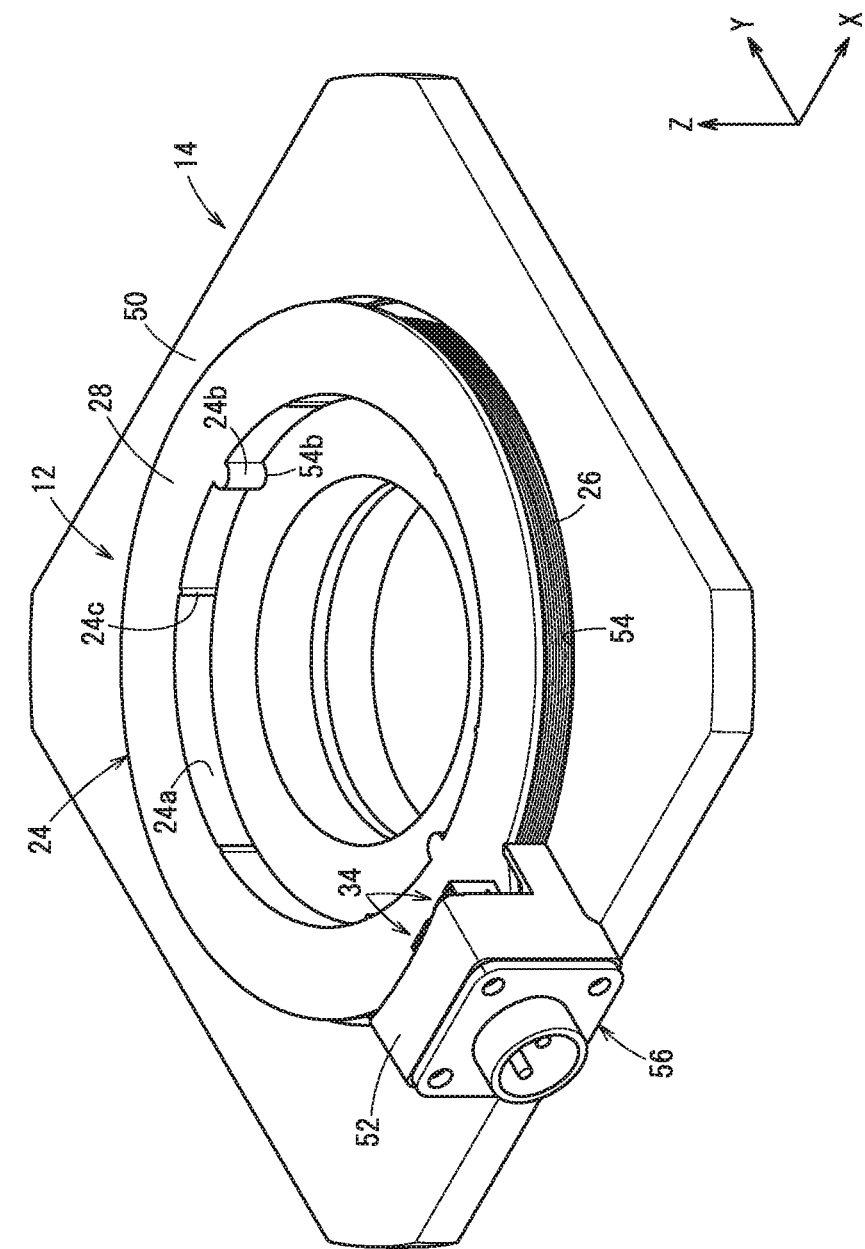
FIG. 2 is a perspective view of a coil and a brake core of an electromagnetic brake.
Figure 3:
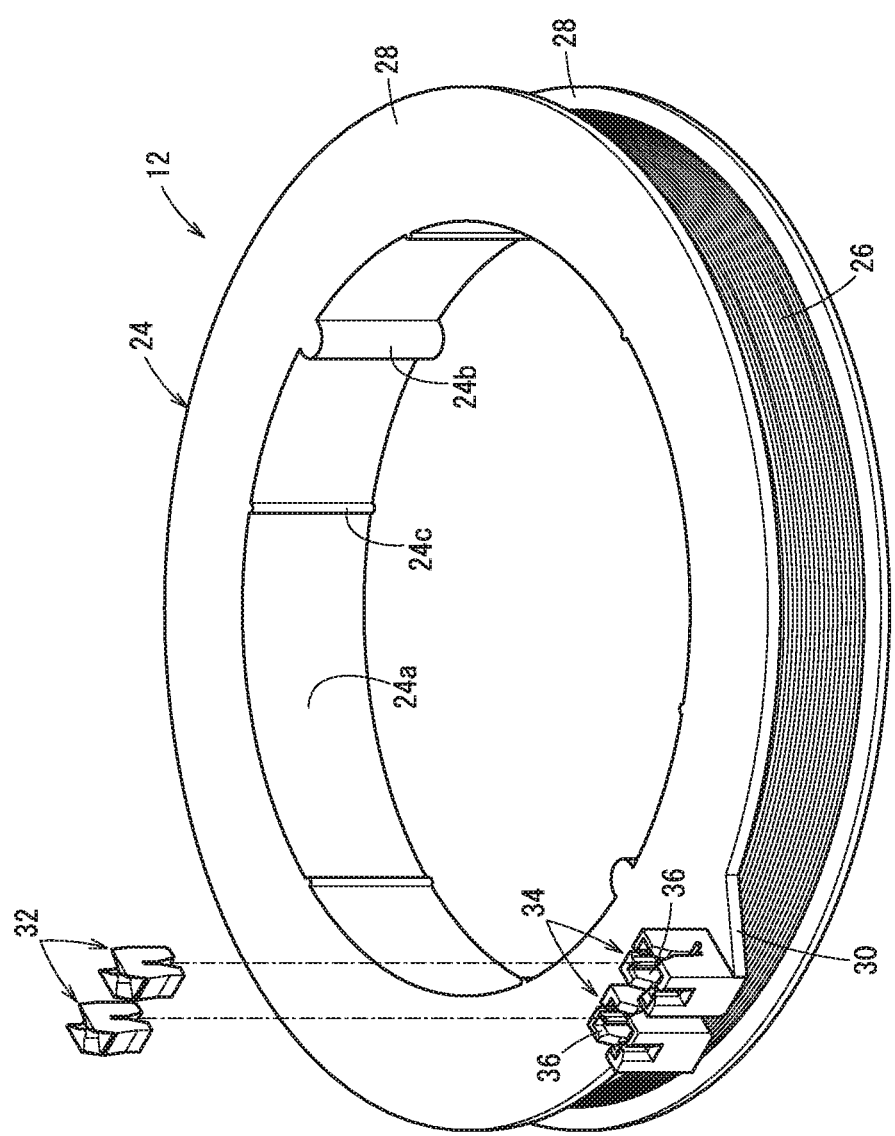
FIG. 3 is a perspective view of the coil.
Figure 4:
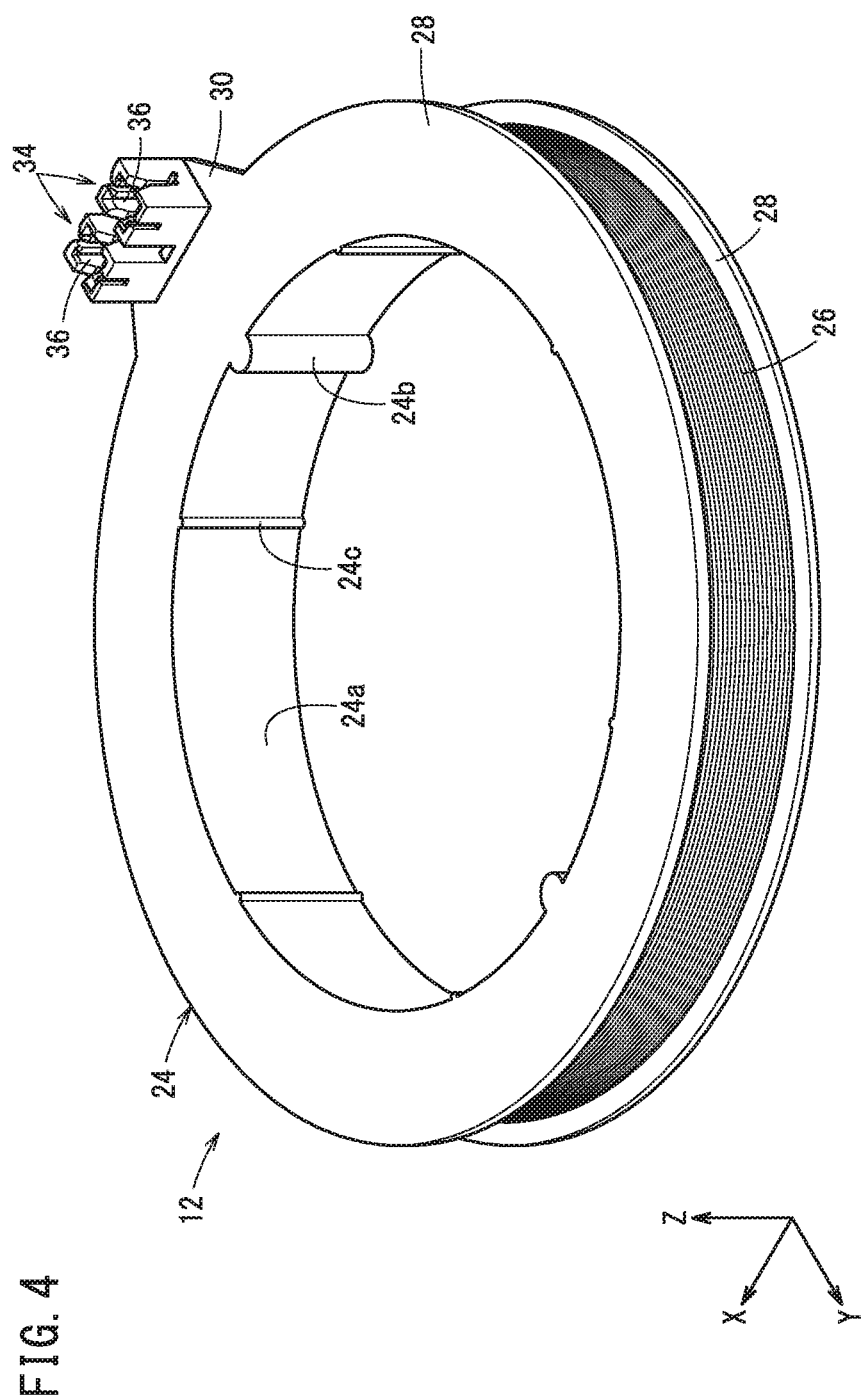
FIG. 4 is a perspective view of the coil.

FIG. 2 is a perspective view of the coil 12 and the brake core 14 of the electromagnetic brake 10. FIG. 3 and FIG. 4 are perspective views of the coil 12. The following description will be given by using the coordinates defined by the X, Y, and Z axes, indicated by the arrows in FIGS. 2 to 4. The coordinates will also be used in the description of the figures after FIG. 4.

The coil 12 includes a coil bobbin 24 with a winding 26 wound thereon. The coil bobbin 24 has flanges 28 on the positive and negative sides of the Z-axis direction. The winding 26 is wound between the two flanges 28 of the coil bobbin 24.

Figure 5A:
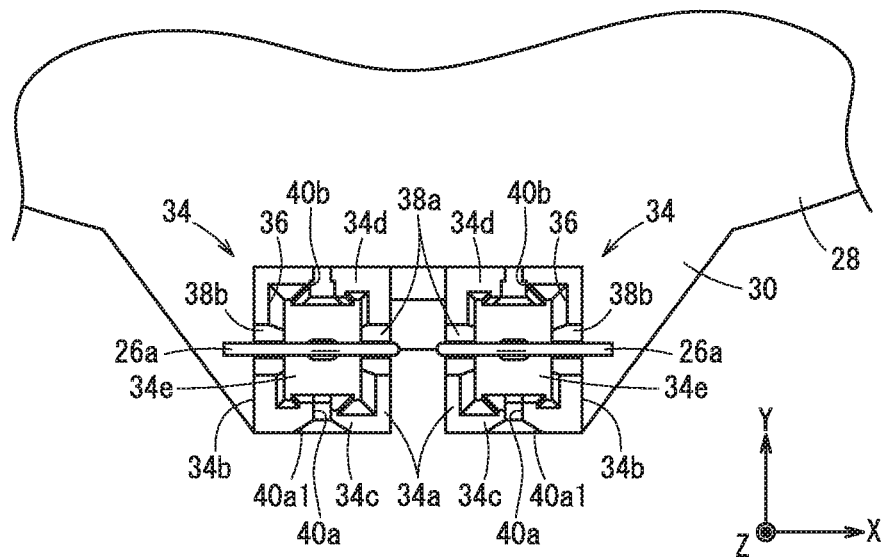
FIGS. 5A and 5B are views showing terminal casings.
Figure 5B:
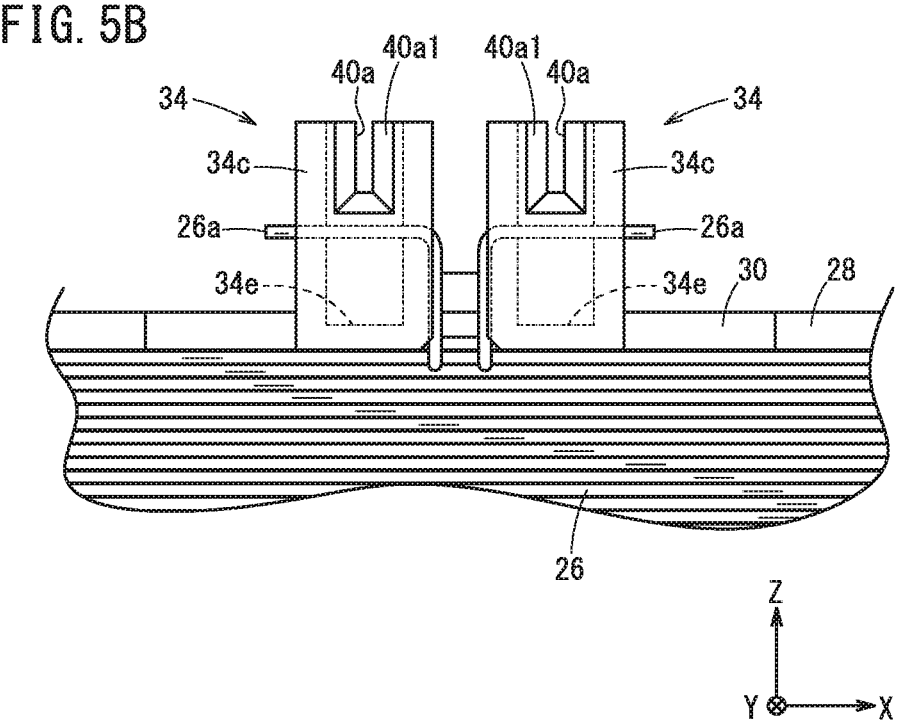

The flange 28 on the positive side of the Z-axis direction in the coil bobbin 24 has an extended portion 30 extending toward the negative side of the Y-axis direction. Two terminal casings 34, each accommodating a terminal 32, are provided in the extended portion 30. The two terminal casings 34 are arranged side by side in the X-axis direction. FIGS. 5A and 5B show the terminal casings 34. FIG. 5A is a diagram of the terminal casings 34 viewed from the positive side of the Z-axis direction. FIG. 5B is a diagram of the terminal casings 34 viewed from the negative side of the Y-axis direction.

The terminal casing 34 is formed in a prismatic or rectangular cylindrical shape extending toward the positive side of the Z-axis direction from the extended portion 30, and an opening 36 into which the terminal 32 is inserted is formed on the positive side of the Z-axis direction, as shown in FIG. 3. As shown in FIGS. 5A and 5B, walls 34a and 34b opposing each other in the X-axis direction are provided in the terminal casing 34 and have respective catches 38a and 38b formed as a slit extending toward the negative side of the Z-axis direction from the opening 36 side.

One end 26a of the winding 26 wound on the coil bobbin 24 is bent to the positive side of the Z-axis direction, passing between the adjacent terminal casings 34, further bent to the negative side of the X-axis direction and engaged in the catches 38a and 38b of the terminal casing 34 located on the negative side of the X-axis direction. Another end 26a of the winding 26 wound on the coil bobbin 24 is bent to the positive side of the Z-axis direction from the part wound on the coil bobbin 24, passing between the adjacent terminal casings 34, further bent to the positive side of the X-axis direction, and engaged in the catches 38a and 38b of the terminal casing 34 located on the positive side of the X-axis direction. Each end 26a of the winding 26 is arranged to extend in the X-axis direction between the catches 38a and 38b at a distance away toward the positive side of Z-axis from a bottom 34e inside the terminal casing 34.

Walls 34c and 34d of each terminal casing 34 opposing each other in the Y-axis direction are formed with electrode guides 40a and 40b, which each are formed as a slit extending from the opening 36 side of the terminal casing 34 to the negative side of the Z-axis direction. The electrode guides 40a and 40b each have an electrode 56a of a connector 56 inserted therein, which will be mentioned later.

Figure 6:
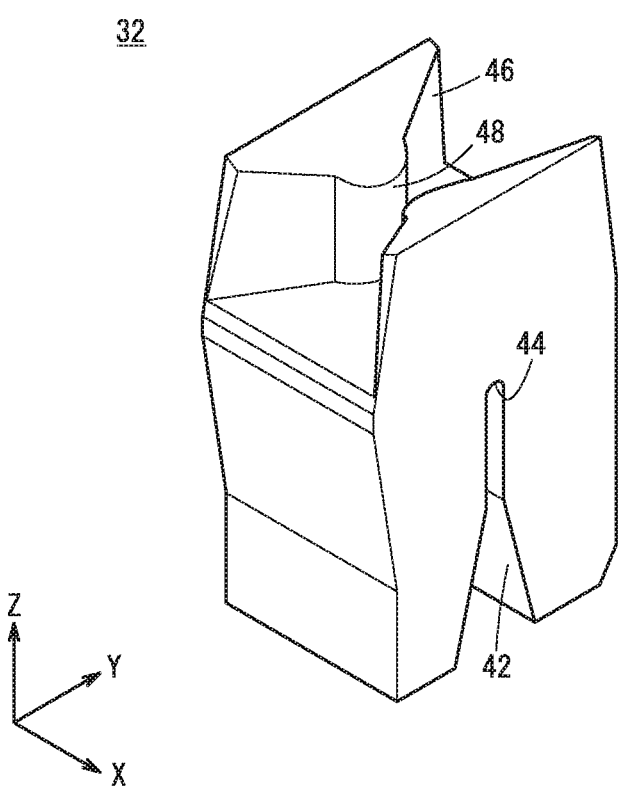
FIG. 6 is a perspective view of a terminal.
Figure 8A:
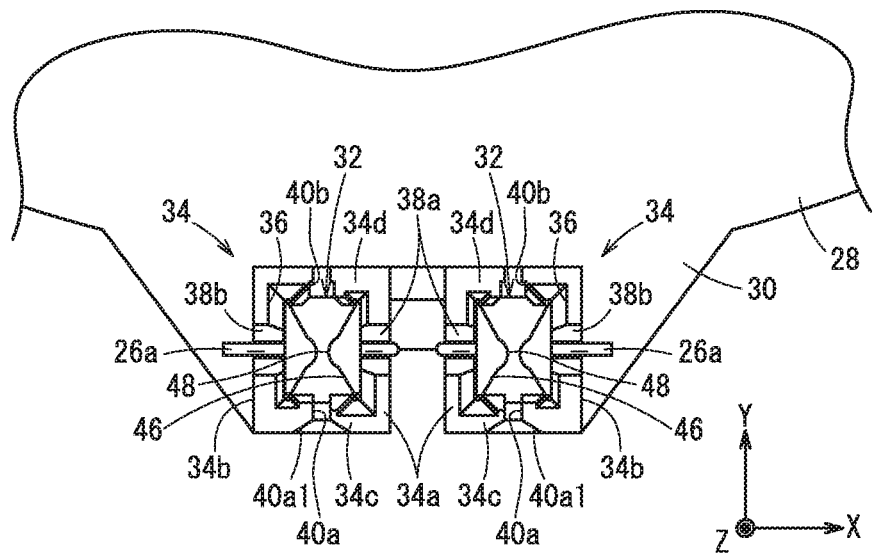
FIGS. 8A and 8B are diagrams showing the terminal casing with the terminal set in place.
Figure 8B:
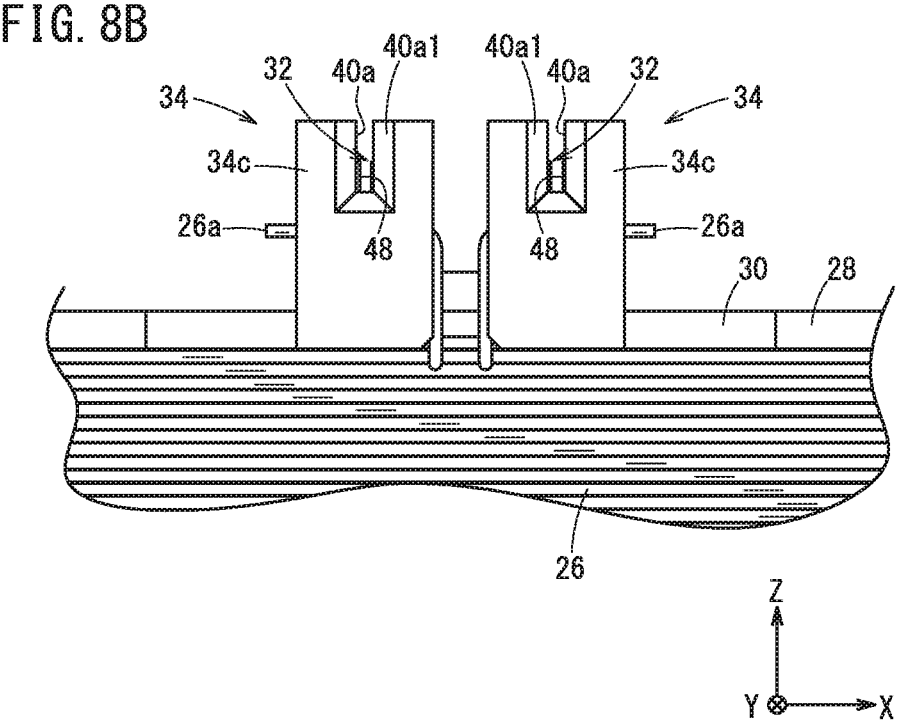

As shown in FIG. 3, the terminals 32 are inserted into the terminal casings 34 from the positive side of the Z-axis direction. FIG. 6 is a perspective view of the terminal 32. FIG. 7A is a diagram of the terminal 32 viewed from the positive side of the X-axis direction. FIG. 7B is a diagram of the terminal 32 viewed from the positive side of the Z-axis direction. FIG. 7C is a diagram of the terminal 32 viewed from the negative side of the Y-axis direction. FIGS. 8A and 8B are diagrams showing the terminal casings 34 with the terminals 32 set in place. FIG. 8A is a diagram of the terminal casings 34 viewed from the positive side of the Z-axis direction. FIG. 8B is a diagram of the terminal casings 34 viewed from the negative side of the Y-axis direction.

As shown in FIG. 7A, when the terminal 32 is viewed from the positive side of the X-axis direction, the terminal 32 is formed with a slit-shaped winding receiver 42 extending from the end surface of the terminal 32 on the negative side of the Z-axis direction toward the positive side of the Z-axis direction. The winding receiver 42, starting from the negative side of the Z-axis direction, is formed such that the width in the Y-axis direction becomes narrower as it goes toward the positive side of the Z-axis direction. The end of the winding receiver 42 on the positive side of the Z-axis direction forms a first contact 44. With each of the terminals 32 set in place in the terminal casing 34 as shown in FIGS. 8A and 8B, the winding 26 disposed between the catches 38a and 38b is inserted in the winding receiver 42 of the terminal 32 so that the winding 26 and the terminal 32 come into contact with each other at the first contact 44. The end 26a of the winding 26 is sandwiched between the catch 38a and the catch 38b, and the winding receiver 42 and fixed inside the terminal casing 34.

As shown in FIG. 7C, when the terminal 32 is viewed from the negative side of the Y-axis direction, the terminal 32 has a slit-shaped electrode receiver 46 extending toward the negative side of the Z-axis direction from the end surface of the terminal 32 on the positive side of the Z-axis direction. As shown in FIG. 7B, the width of the electrode receiver 46 in the X-axis direction is narrowest in the center of the electrode receiver 46 with respect to the Y-axis direction, and this portion forms a second contact 48.

Figure 9:
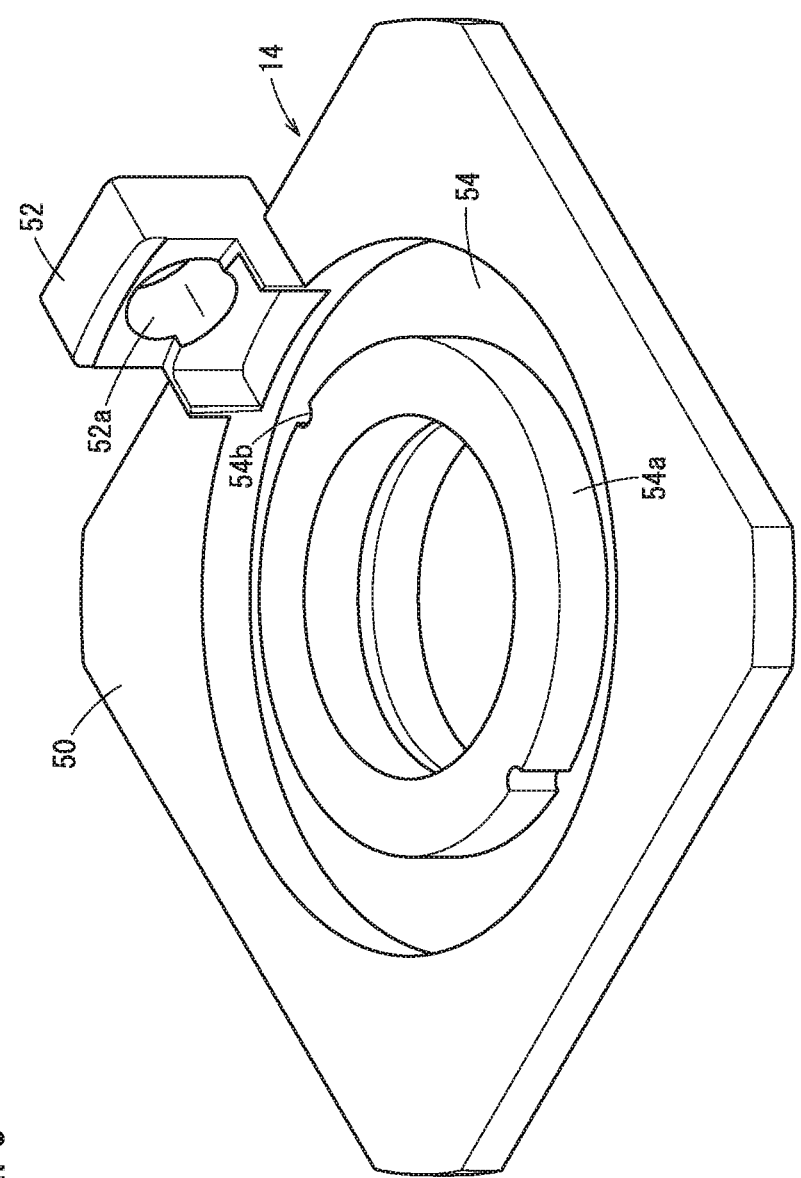
FIG. 9 is a perspective view of a brake core.
Figure 10:
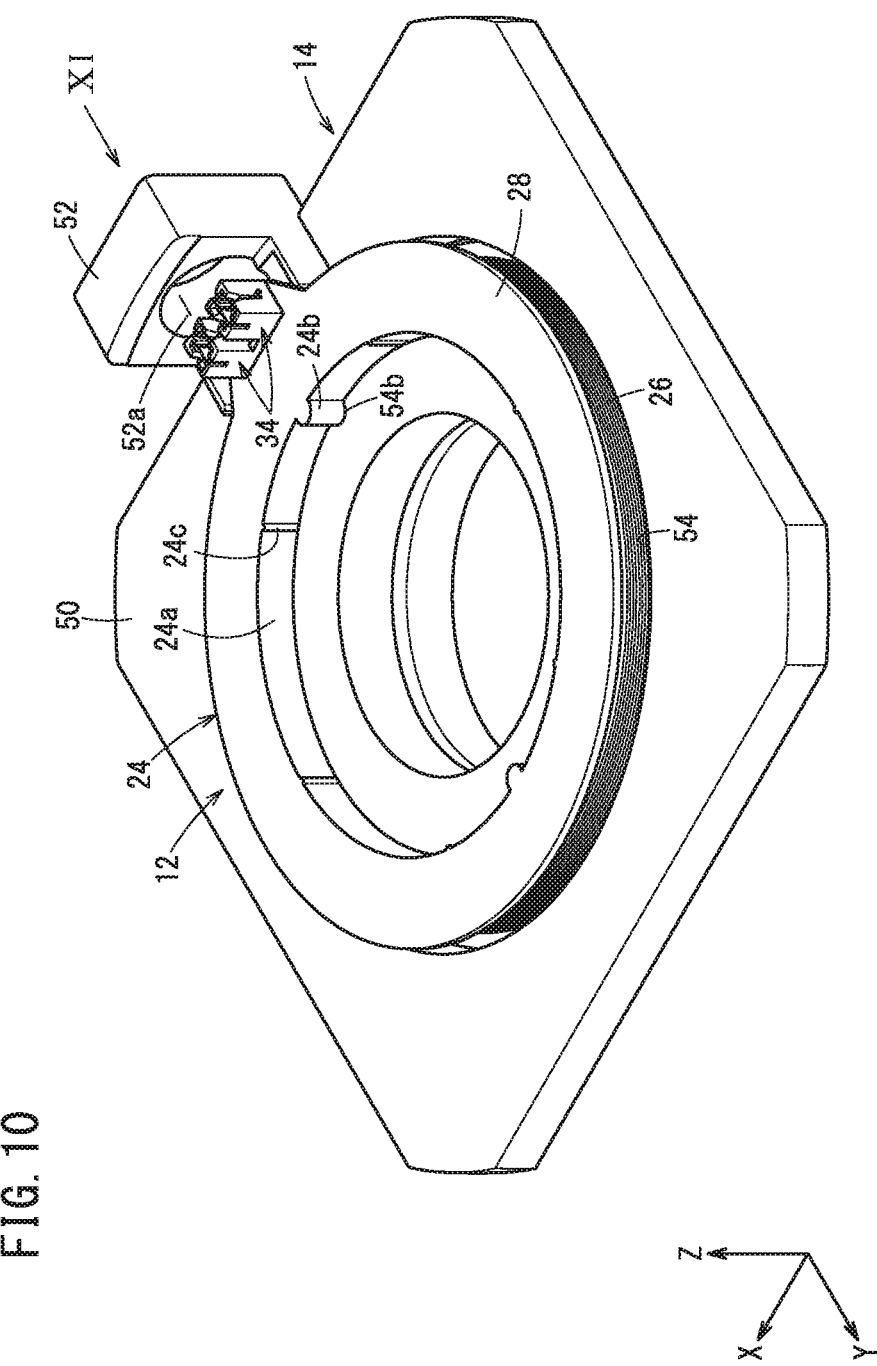
FIG. 10 is a perspective view of the brake core with a coil attached.
Figure 11:
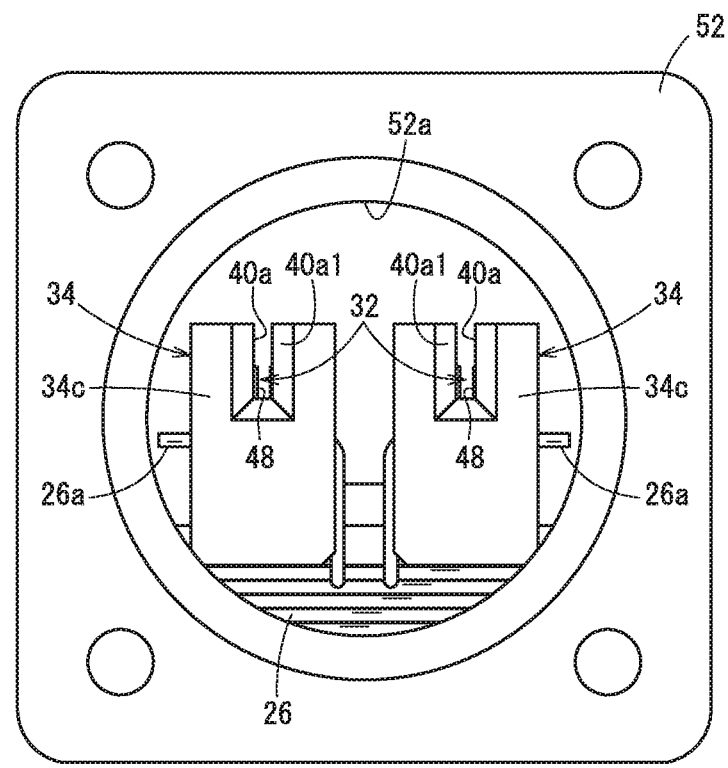
FIG. 11 is an XI view in FIG. 10.

FIG. 9 is a perspective view of the brake core 14. FIG. 10 is a perspective view of the brake core 14 with the coil 12 installed. FIG. 11 is an XI view in FIG. 10. The brake core 14 includes a main body 50, a connector attachment 52 and a coil bobbin holder 54.

The main body 50 is formed in an approximately square shape when viewed from the positive side of the Z-axis direction, and has the connector attachment 52 on the negative side of the main body 50 with respect to the Y-axis direction, and the coil bobbin holder 54 in the central portion of the main body 50.

The connector attachment 52 is formed upright in the Z-axis direction on the main body 50. A connector insertion hole 52a that penetrates through in the Y-axis direction is formed in the connector attachment 52. As shown in FIG. 2, the connector 56 is externally inserted into the connector insertion hole 52a of the connector attachment 52.

As shown in FIGS. 9 and 10, the coil bobbin holder 54 is formed in the shape of a circular groove. The coil bobbin 24 is accommodated in the coil bobbin holder 54. The coil bobbin holder 54 has notches 54b formed in a depressed shape on its peripheral surface 54a opposing the inner peripheral surface 24a of the coil bobbin 24. The notches 54b are provided at two points on the surface 54a and are formed to extend in the Z-axis direction.

The coil bobbin 24 has projections 24b formed in a shape protruding from the inner peripheral surface 24a. The projections 24b are provided at two points on the inner peripheral surface 24a corresponding to the notches 54b and are formed to extend in the Z-axis direction. When the coil bobbin 24 is accommodated in the coil bobbin holder 54, the projections 24b of the coil bobbin 24 are fitted into the notches 54b of the coil bobbin holder 54. This allows the terminal casing 34 to be positioned at the location opposing the connector insertion hole 52a of the connector attachment 52, as shown in FIG. 11.

The coil bobbin 24 has ribs 24c formed in a shape protruding from the inner peripheral surface 24a. The ribs 24c are provided at six points on the inner peripheral surface 24a and are formed to extend in the Z-axis direction. The ribs 24c fill the gap between the inner peripheral surface 24a of the coil bobbin 24 and the surface 54a of the coil bobbin holder 54, thus restraining the coil bobbin 24 from rattling inside the coil bobbin holder 54.

Figure 12:
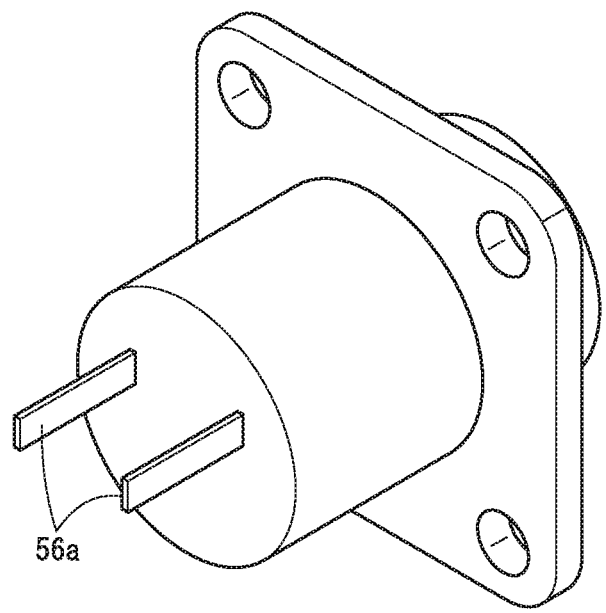
FIG. 12 is a perspective view of a connector.

FIG. 12 is a perspective view of the connector 56. The connector 56 has two plate electrodes 56a protruding in the Y-axis direction. The two electrodes 56a are arranged apart in the X-axis direction. The electrodes 56a are provided in such a way that their width lies in the Z-axis direction and their thickness lies in the X-axis direction.

Figure 13:
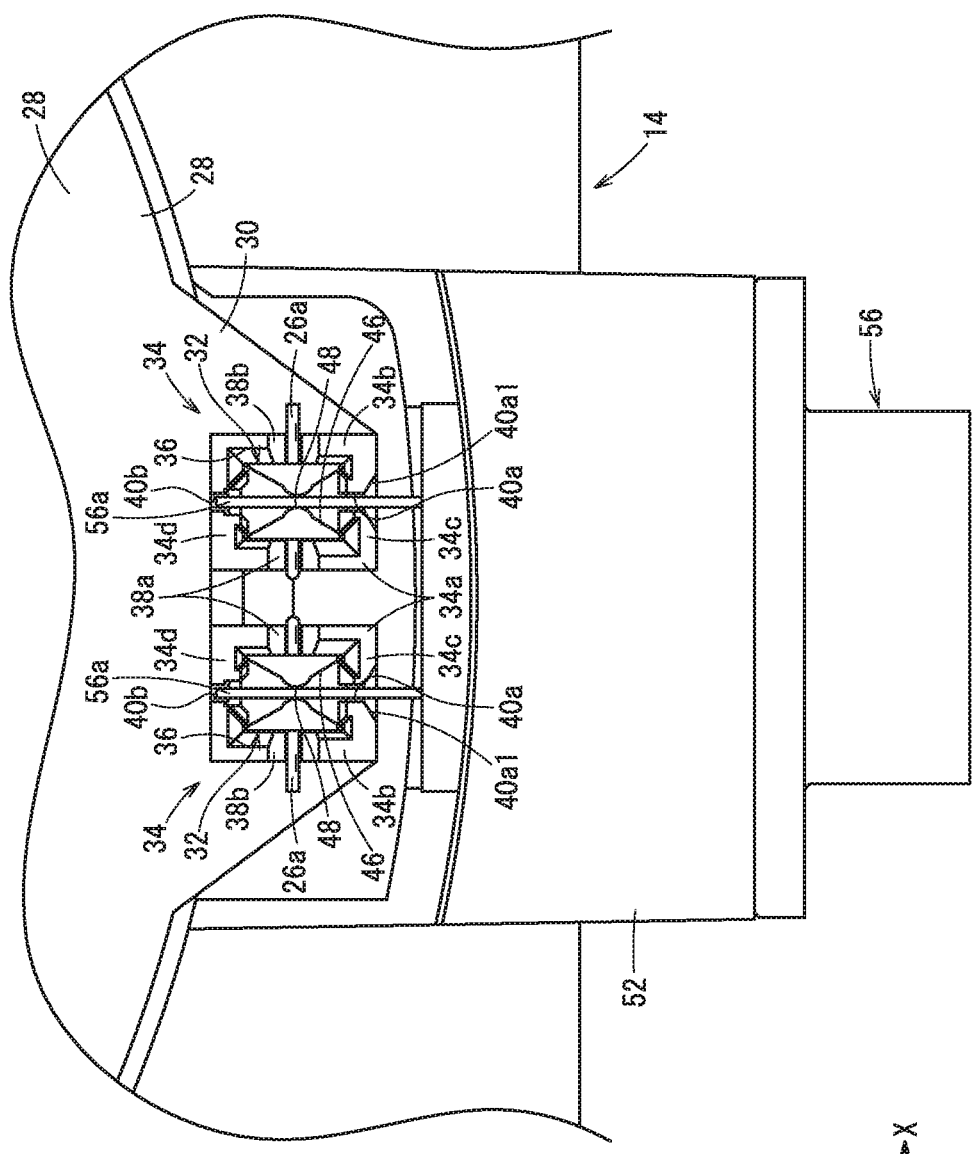
FIG. 13 is a view showing the connector mounted on the brake core.

FIG. 13 is a diagram showing the connector 56 mounted on the brake core 14. The connector 56 is inserted into the connector insertion hole 52a of the connector attachment 52 from the negative side of the Y-axis direction toward the positive side of the Y-axis direction. When the connector 56 is inserted into the connector insertion hole 52a of the connector attachment 52, each electrode 56a is guided by the electrode guide 40a of the terminal casing 34 and inserted into the electrode receiver 46 of the terminal 32 inside the terminal casing 34, and the electrode 56a is connected to the terminal 32 at the second contact 48. The tip of the electrode 56a passes through the electrode receiver 46 of the terminal 32 and is inserted into the electrode guide 40b formed on the wall 34d of the terminal casing 34 on the positive side of the Y-axis direction. Since the electrode 56a is inserted in the electrode receiver 46, movement of the terminal 32 in the positive direction of the Z-axis is restrained, preventing the terminal 32 from falling off the terminal casing 34.

As shown in FIG. 11, a tapered portion 40a1 is formed in a tapered shape in the opening of the electrode guide 40a formed in the wall 34c of the terminal casing 34, on the side opposing the connector attachment 52. This allows the electrode 56a to be inserted into the electrode guide 40a along the tapered portion 40a1 and guided to the second contact 48 of the terminal 32.

[Operation and Effect]

In the prior art, the electrode 56a of the connector 56 and the windings 26 of the coil 12 had to be connected by soldering or the like in order to connect the connector 56 with the windings 26 of the coil 12, and the fabrication of the electromagnetic brake 10 was cumbersome.

In the present embodiment, the coil bobbin 24 in the electromagnetic brake 10 includes the terminal casings 34 in each of which the terminal 32 is set. The terminal casing 34 is formed with catches 38a and 38b in which the winding 26 is engaged. The terminal 32 has the first contact 44 that comes into contact with the winding 26 held by the catches 38a and 38b when the terminal 32 is inserted into the terminal casing 34. The terminal 32 also has the second contact 48 that, with the terminal 32 inserted in the terminal casing 34, contacts the electrode 56a of the connector 56 when the connector 56 is inserted into the connector insertion hole 52a of the brake core 14.

In the electromagnetic brake 10 of the present embodiment, when the terminal 32 is inserted into the terminal casing 34, a connection is created between the first contact 44 of the terminal 32 and the winding 26 of the coil 12 without soldering. Also, when the connector 56 is inserted in the connector insertion hole 52a of the brake core 14 with the terminal 32 inserted in the terminal casing 34, a connection is created between the electrode 56a and the second contact 48 of the terminal 32 without soldering. That is, because the electrode 56a of the connector 56 is connected to the winding 26 of the coil 12 is connected via the terminal 32, the connection between the electrodes 56a and the winding 26 is created without soldering. Thus, the fabrication of the electromagnetic brake 10 can be facilitated.

In the present embodiment, the terminal casing 34 has the electrode guide 40a in the wall 34c opposing the connector insertion hole 52a, which guides the electrode 56a of the connector 56 to the second contact 48 of the terminal 32 set in place in the terminal casing 34. In this structure, when the connector 56 is inserted into the connector insertion hole 52a, the electrode 56a is guided by the electrode guide 40a and connected to the second contact 48. As a result, the connection of the electrode 56a of the connector 56 with the second contact 48 of the terminal 32 is created without soldering. Thus, the fabrication of the electromagnetic brake 10 can be facilitated.

In the present embodiment, the electrode guide 40a has a tapered portion 40a1 formed in a tapered shape in the opening thereof that is located on the side opposing the connector insertion hole 52a. In this structure, the electrode 56a of the connector 56 is inserted into the electrode guide 40a along the tapered portion 40a1 and guided to the second contact 48 of the terminal 32. Thus, when the connector 56 is inserted into the connector insertion hole 52a, the connection between the electrode 56a and the terminal 32 is created, whereby the fabrication of the electromagnetic brake 10 can be facilitated.

In the present embodiment, the coil bobbin holder 54 of the brake core 14 has notches 54b on the surface 54a opposing the coil bobbin 24 while the coil bobbin 24 has projections 24b on an inner peripheral surface 24a opposing the notches 54b of the coil bobbin holder 54. With the coil bobbin 24 housed in the coil bobbin holder 54, the projections 24b are engaged with the notches 54b. This allows the terminal casing 34 to be positioned at the position opposing the connector insertion hole 52a of the connector attachment 52, making it easier to insert the electrode 56a of the connector 56 into the terminal casing 34, whereby the fabrication of the electromagnetic brake 10 can be facilitated.

In this embodiment, the coil bobbin 24 has ribs 24c on the inner peripheral surface 24a opposing the coil bobbin holder 54. The ribs 24c fill the gap between the inner peripheral surface 24a of the coil bobbin 24 and the surface 54a of the coil bobbin holder 54. This can restrain the coil bobbin 24 from rattling inside the coil bobbin holder 54, hence improving the quality of conduction with the electrode 56a of the connector 56 inserted in the terminal casing 34.

Second Embodiment

The electromagnetic brake 10 of the second embodiment differs from the electromagnetic brake 10 of the first embodiment in the shape of the terminal casing 34 of the coil bobbin 24, the shape of the terminal 32, and the shape of the electrode 56a of the connector 56. The electromagnetic brake 10 of the second embodiment will be described below, but description of the same configurations as those of the electromagnetic brake 10 of the first embodiment will be omitted.

Figure 14:
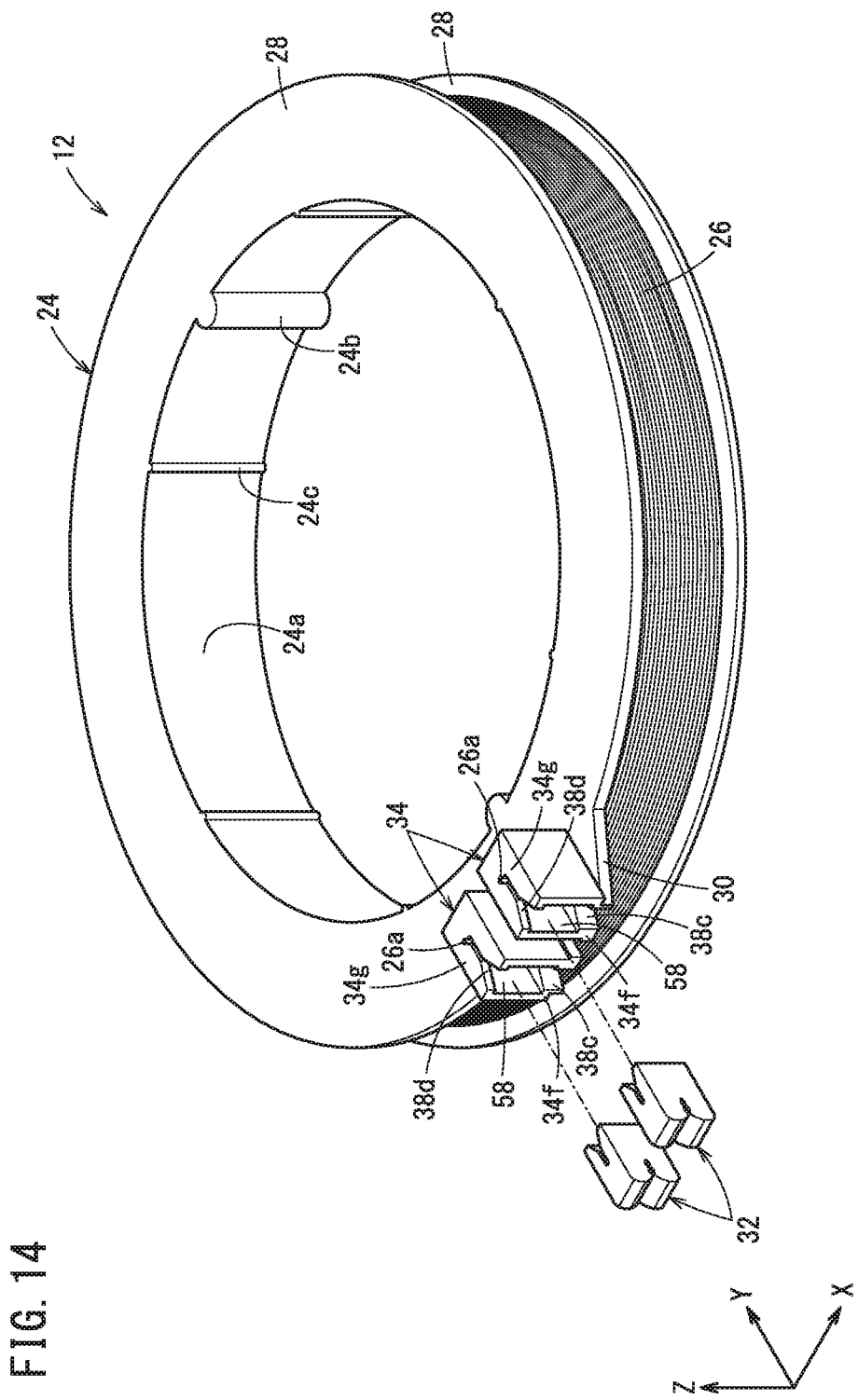
FIG. 14 is a perspective view of a coil.
Figure 15:
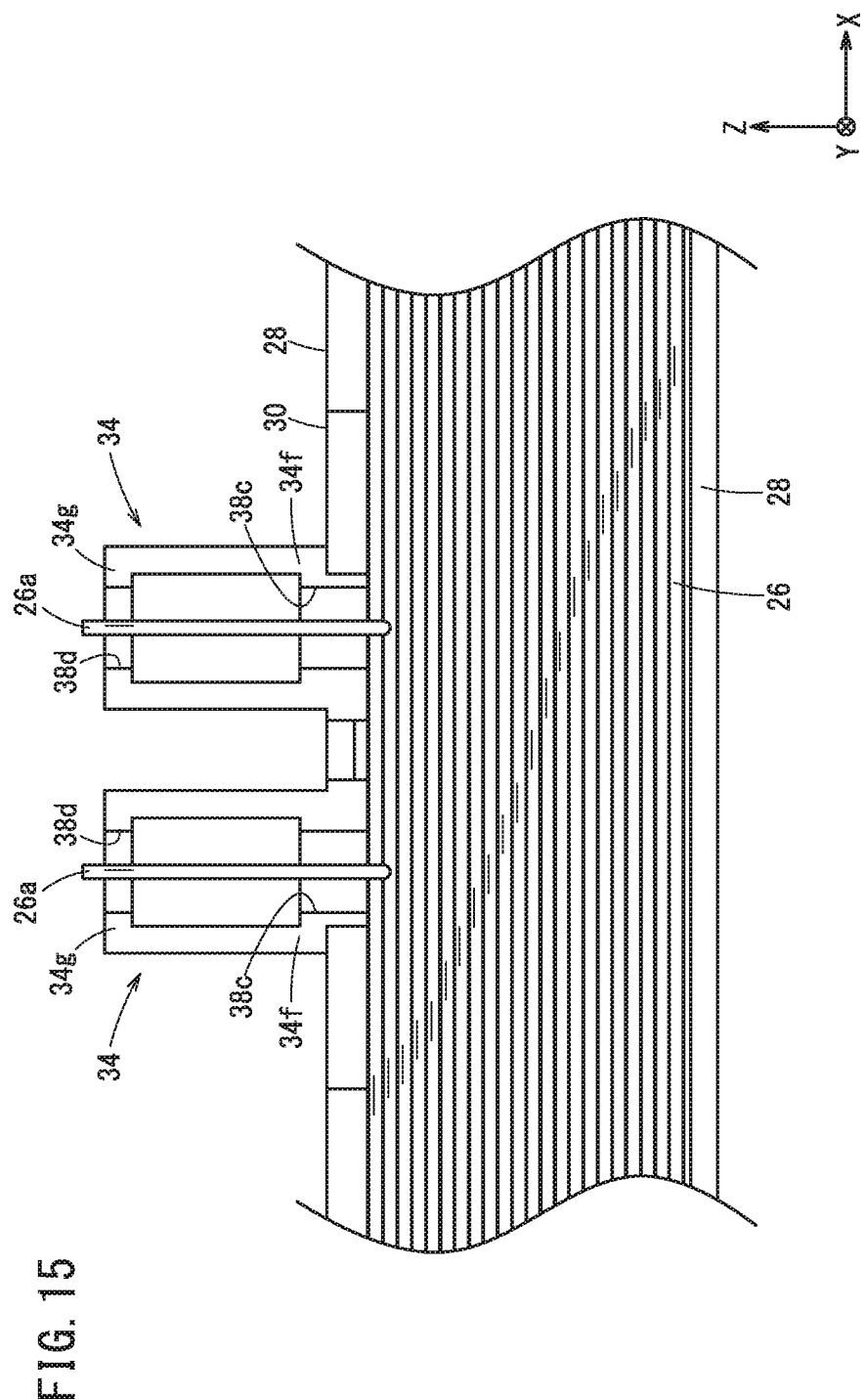
FIG. 15 is a diagram of a terminal casing from the negative side of the Y-axis direction.

FIG. 14 is a perspective view of a coil 12. FIG. 15 is a diagram of a terminal casing 34 from the negative side of the Y-axis direction. The coil bobbin 24 has flanges 28 on the positive and negative sides with respect to the Z-axis direction. A winding 26 is wound between the two flanges 28 of the coil bobbin 24 to form the coil 12.

As shown in FIG. 14, the flange 28 on the positive side of the Z-axis direction in the coil bobbin 24 has an extended portion 30 extending toward the negative side of the Y-axis direction. Two terminal casings 34 each accommodating a terminal 32 are provided in the extended portion 30. The two terminal casings 34 are arranged side by side in the X-axis direction.

The terminal casing 34 is formed on the extended portion 30 in a prismatic or rectangular cylindrical shape extending along the Y-axis direction, and an opening 58 into which the terminal 32 is inserted is formed on the negative side of the Y-axis direction, as shown in FIG. 14. As shown in FIGS. 14 and 15, walls 34f and 34g opposing each other in the Z-axis direction are provided in the terminal casing 34 and have respective catches 38c and 38d formed as a slit extending from the opening 58 side to the negative side of the Y-axis direction.

One end 26a of the winding 26 wound on the coil bobbin 24 is bent to the positive side of the Z-axis direction and engaged in the catches 38c and 38d of the terminal casing 34 located on the negative side of the X-axis direction. Another end 26a of the winding 26 wound on the coil bobbin 24 is bent to the positive side of the Z-axis direction and engaged in the catches 38c and 38d of the terminal casing 34 located on the positive side of the X-axis direction. Though in the first embodiment, each of the ends 26a of the winding 26 is bent twice and engaged in the catches 38a and 38b of the terminal casing 34, each of the ends 26a of the winding 26 of this embodiment is bent only once and engaged in the catches 38c and 38d of the terminal casing 34.

Figure 16:
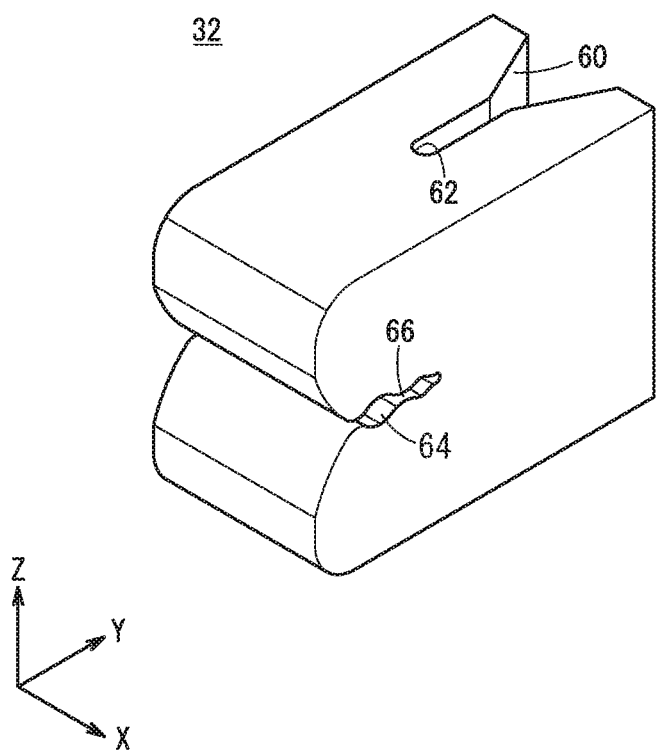
FIG. 16 is a perspective view of a terminal.
Figure 17A:
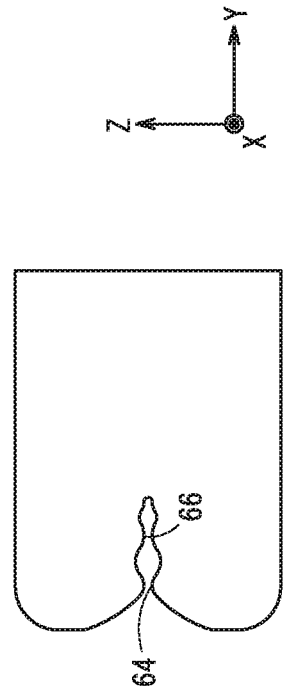
FIG. 17A is a diagram of the terminal viewed from the positive side of the Z-axis direction.
Figure 17B:
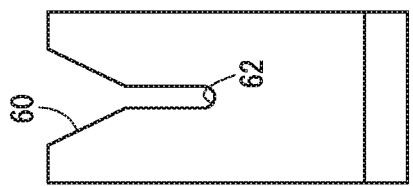
FIG. 17B is a diagram of the terminal viewed from the negative side in the Y-axis direction.
Figure 17C:
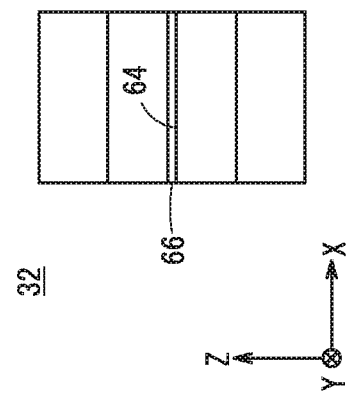
FIG. 17C is a diagram of the terminal viewed from the positive side in the X-axis direction.
Figure 18:
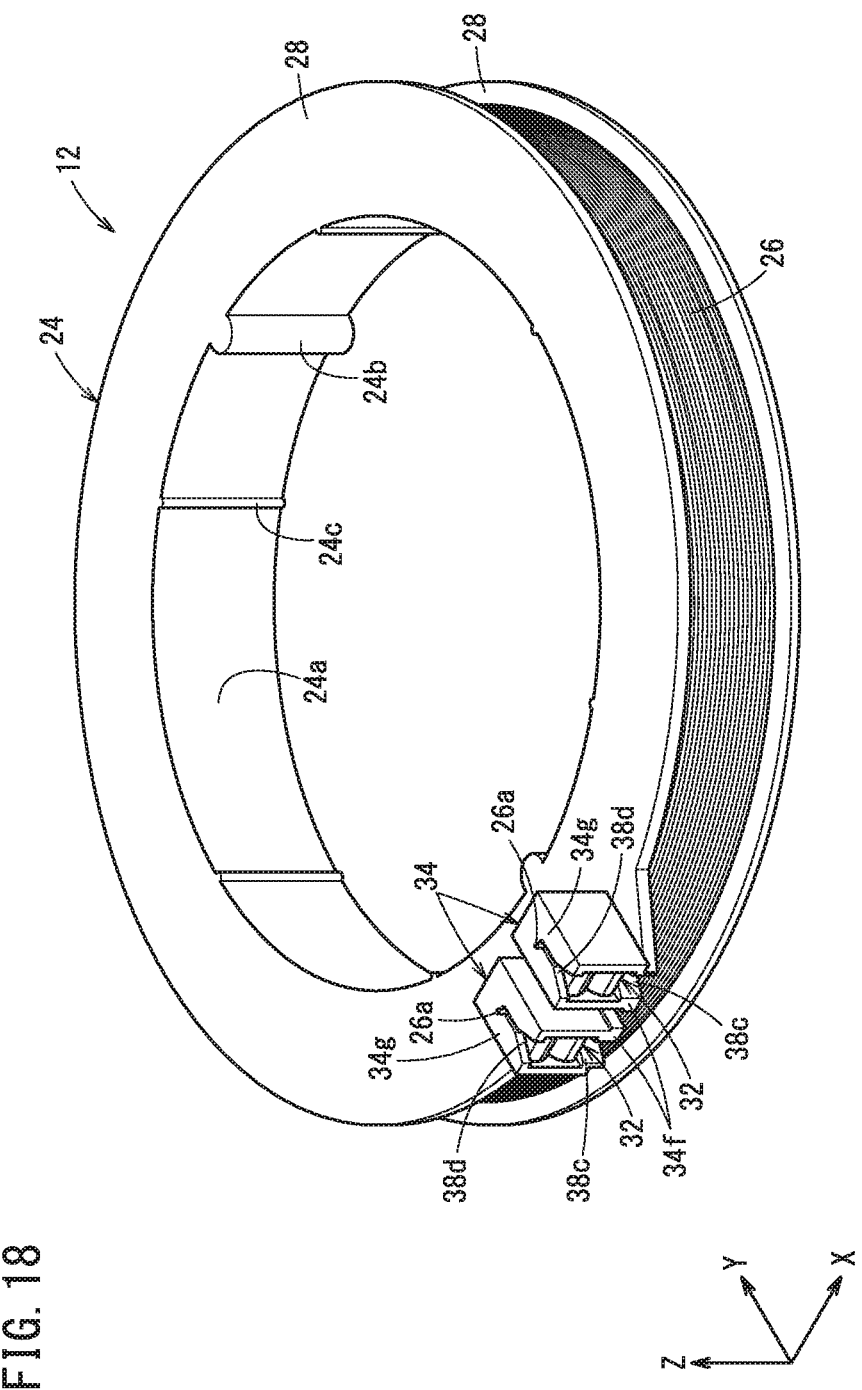
FIG. 18 is a view showing the terminal casing with the terminal set in place.

As shown in FIG. 14, the terminals 32 are inserted into the terminal casings 34 from the negative side of the Y-axis direction. FIG. 16 is a perspective view of the terminal 32. FIG. 17A is a diagram of the terminal 32 viewed from the positive side of the Z-axis direction. FIG. 17B is a diagram of the terminal 32 viewed from the negative side of the Y-axis direction. FIG. 17C is a diagram of the terminal 32 viewed from the positive side of the X-axis direction. FIG. 18 is a perspective view showing the terminal casings 34 with the terminals 32 set in place.

As shown in FIG. 17A, when the terminal 32 is viewed from the positive side of the Z-axis direction, the terminal 32 is formed with a slit-shaped winding receiver 60 extending from the end surface of the terminal 32 on the positive side of the Y-axis direction toward the negative of the Y-axis. The winding receiver 60, starting from the positive side of the Y-axis direction, is formed such that the width in the X-axis direction becomes narrower as it goes toward the negative side of the Y-axis direction. The end of the winding receiver 60 on the negative side of the Y-axis direction forms a first contact 62. With each of the terminals 32 set in place in the terminal casing 34 as shown in FIG. 18, the winding 26 disposed between the catches 38c and 38d is inserted in the winding receiver 60 so that the winding 26 and the terminal 32 come into contact with each other at the first contact 62. The end 26a of the winding 26 is sandwiched between the catch 38c and the catch 38d, and the winding receiver 60 and fixed inside the terminal casing 34.

As shown in FIG. 17C, when the terminal 32 is viewed from the positive side of the X-axis direction, the terminal 32 has a slit-shaped electrode receiver 64 extending toward the positive side of the Y-axis direction from the end surface of the terminal 32 on the negative side of the Y-axis direction. The interior, or slit of the electrode receiver 64 is curvedly formed in the Z-axis direction and the narrowest portion of the slit in the electrode receiver 64 with respect to the Z-axis direction forms a second contact 66.

Figure 19:
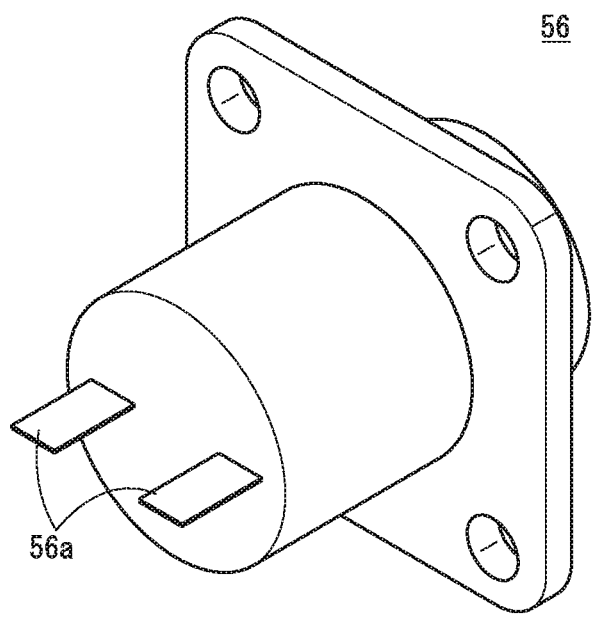
FIG. 19 is a perspective view of a connector.

FIG. 19 is a perspective view of the connector 56. The connector 56 has two plate electrodes 56a protruding in the Y-axis direction. The two electrodes 56a are arranged apart in the X-axis direction. The electrodes 56a are provided in such a way that their width lies in the X-axis direction and their thickness lies in the Z-axis direction.

FIG. 20A is a diagram showing a state just before the connector 56 is mounted in the brake core 14. FIG. 20B is a diagram showing a state in which the connector 56 has been mounted in the brake core 14. The connector 56 is inserted into the connector insertion hole 52a of the connector attachment 52 from the negative side of the Y-axis direction toward the positive side of the Y-axis direction. When the connector 56 is inserted into the connector insertion hole 52a of the connector attachment 52, each electrode 56a is inserted into the electrode receiver 64 of the terminal 32, and the electrode 56a is connected to the terminal 32 at the second contact 66. Since the electrode 56a is inserted in the electrode receiver 64, movement of the terminal 32 in the negative direction of the Y-axis is restrained, preventing the terminal 32 from falling off the terminal casing 34.

[Operation and Effect]

In the present embodiment, the coil bobbin 24 in the electromagnetic brake 10 includes the terminal casings 34 in each of which the terminal 32 is set. The terminal casing 34 is formed with catches 38c and 38d in which the winding 26 engaged. The terminal 32 has the first contact 62 that comes into contact with the winding 26 held by the catches 38c and 38d when the terminal 32 is inserted into the terminal casing 34. The terminal 32 also has the second contact 66 that, with the terminal 32 inserted in the terminal casing 34, contacts the electrode 56a of the connector 56 when the connector 56 is inserted into the connector insertion hole 52a of the brake core 14.

In the electromagnetic brake 10 of the present embodiment, when the terminal 32 is inserted into the terminal casing 34, a connection is created between the first contact 62 of the terminal 32 and the winding 26 of the coil 12 without soldering. Also, when the connector 56 is inserted in the connector insertion hole 52a of the brake core 14 with the terminal 32 inserted in the terminal casing 34, a connection is created between the electrode 56a and the second contact 66 of the terminal 32 without soldering. That is, because the electrode 56a of the connector 56 is connected to the winding 26 of the coil 12 is connected via the terminal 32, the connection between the electrodes 56a and the winding 26 is created without soldering. Thus, the fabrication of the electromagnetic brake 10 can be facilitated.

Other Embodiments

The shape of the terminal 32 need not be limited to those of the terminals 32 described in the first and second embodiments. The shape of the terminal 32 is allowed as long as the ends 26a of the winding 26 set between the catches 38a and 38b, or between the catches 38c and 38d, of the terminal casing 34 can come into contact with the first contact 44 or 62 of the terminal 32 when the terminal 32 is inserted into the terminal casing 34. The shape of the terminal 32 is allowed as long as each of the electrodes 56a of the connector 56 inserted into the connector insertion hole 52a can connect to the second contact 48 or 66 of the terminal 32, with the terminal 32 inserted in the terminal casing 34.

The shape of the electrodes 56a of the connector 56 may not be limited to that of the electrodes 56a described in the first and second embodiments. The electrode 56a may have a cylindrical shape. The electrode 56a may also be formed of a lead. The number of electrodes 56a need not be two, but may be three or more.

Technical Ideas Obtained from the Embodiments

The technical ideas that may be grasped from the above embodiments will be described below.

The electromagnetic brake (10) for the electric motor, includes the coil bobbin (24) on which the winding (26) is wound, the connector (56) including a plurality of electrodes (56a) and configured to be externally inserted; and the brake core (14) including the coil bobbin holder (54) in which the coil bobbin is housed and the connector insertion hole (52a) into which the connector is inserted, wherein the coil bobbin includes the plurality of terminal casings (34) in each of which the terminal (32) is set, and the catches (38a, 38b) formed on any of walls of each of the terminal casings so as to have the winding engaged therein, and wherein the terminal includes the first contact (44) configured to create a connection with the winding engaged in the catches, with the terminal inserted in the terminal casing, and the second contact (48) configured to come into contact with the electrode of the connector inserted in the connector insertion hole, with the terminal set in place in the terminal casing. This configuration facilitates the fabrication of an electromagnetic brake.

In the above electromagnetic brake for the electric motor, the terminal casings each include the electrode guide (40a) configured to oppose a side of the connector insertion hole and are configured to guide the electrode of the connector to the second contact of the terminal set in place in the terminal casing, and with the connector inserted in the connector insertion hole, the electrodes are each inserted in the electrode guide of the terminal casing and come into contact with the second contact in the terminal casing. This configuration facilitates the fabrication of the electromagnetic brake.

In the above electromagnetic brake for the electric motor, the electrode guide includes the tapered portion (40a1) in a tapered shape formed around an opening on the outer side of the terminal casing. This configuration facilitates the fabrication of the electromagnetic brake.

In the above electromagnetic brake for the electric motor, the coil bobbin holder includes the notch (54b) in the surface (54a) opposing the coil bobbin, the coil bobbin includes the projection (24b) on the surface (24a) of the coil bobbin holder opposing the notch, and the projection is engaged with the notch when the coil bobbin is housed in the coil bobbin holder. Since this configuration enables the terminal casing to be positioned so as to oppose the connector insertion hole, the connector electrode can be easily inserted into the terminal casing, whereby the fabrication of the electromagnetic brake can be facilitated.

In the above electromagnetic brake for the electric motor, the coil bobbin includes the rib (24c) on the surface opposing the coil bobbin holder. This can restrain the coil bobbin from rattling inside the coil bobbin holder, hence improving the quality of conduction with the electrode of the connector inserted in the terminal casing.

The present invention is not limited to the embodiments described above, and it goes without saying that the embodiments can be freely modified within a range that does not deviate from the essence and gist of the present invention as set forth in the appended claims.

What is claimed is:

1. An electromagnetic brake for an electric motor, comprising:
    a coil bobbin on which a winding is wound;
    a connector including a plurality of electrodes and configured to be externally inserted; and
    a brake core including a coil bobbin holder in which the coil bobbin is housed and a connector insertion hole into which the connector is inserted,
    wherein the coil bobbin comprises a plurality of terminal casings in each of which a terminal is set, and catches formed on any of walls of each of the terminal casings so as to have the winding engaged therein, and
    wherein the terminal includes:
        a first contact configured to create a connection with the winding engaged in the catches, with the terminal inserted in the terminal casing; and
        a second contact configured to come into contact with the electrode of the connector inserted in the connector insertion hole, with the terminal set in place in the terminal casing.

2. The electromagnetic brake for the electric motor according to claim 1,
    wherein the terminal casings each include an electrode guide configured to oppose a side of the connector insertion hole and are configured to guide the electrode of the connector to the second contact of the terminal set in place in the terminal casing, and
    with the connector inserted in the connector insertion hole, the electrodes are each inserted in the electrode guide of the terminal casing and come into contact with the second contact in the terminal casing.

3. The electromagnetic brake for the electric motor according to claim 2, wherein the electrode guide includes a tapered portion in a tapered shape formed around an opening on an outer side of the terminal casing.

4. The electromagnetic brake for the electric motor according to claim 1,
    wherein the coil bobbin holder includes a notch in a surface opposing the coil bobbin,
    the coil bobbin includes a projection on a surface of the coil bobbin holder opposing the notch, and
    the projection is engaged with the notch when the coil bobbin is housed in the coil bobbin holder.

5. The electromagnetic brake for the electric motor according to claim 1, wherein the coil bobbin includes a rib on a surface opposing the coil bobbin holder.

6. The electromagnetic brake for the electric motor according to claim 1, wherein the terminal defines a winding receiver, the winding including an end that is positioned between one of the catches of the terminal casing and the winding receiver of the terminal when the terminal is received in the terminal casing.

7. The electromagnetic brake for the electric motor according to claim 1, wherein the terminal casing defines a cavity therein, the terminal being configured for removable receipt within the cavity of the terminal casing.

8. The electromagnetic brake for the electric motor according to claim 7, wherein the terminal is prevented from being dislodged from the cavity of the terminal casing when the electrode of the connector is in contact with the second contact of the terminal.

* * * * *